United States Patent
Lee et al.

(10) Patent No.: US 9,122,244 B2
(45) Date of Patent: Sep. 1, 2015

(54) HOLOGRAPHY DEVICES, THREE-DIMENSIONAL IMAGE DISPLAY APPARATUSES INCLUDING THE SAME, AND METHODS OF PROCESSING HOLOGRAPHY IMAGES

(75) Inventors: Gae-hwang Lee, Hwaseong-si (KR); Jae-eun Jung, Seoul (KR); Kyu-young Hwang, Ansan-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 245 days.

(21) Appl. No.: 13/600,801

(22) Filed: Aug. 31, 2012

(65) Prior Publication Data
US 2013/0135701 A1   May 30, 2013

(30) Foreign Application Priority Data
Nov. 24, 2011  (KR) .................. 10-2011-0123665

(51) Int. Cl.
| G03H 1/02 | (2006.01) |
| G02B 27/44 | (2006.01) |
| G03H 1/04 | (2006.01) |

(52) U.S. Cl.
CPC ........... *G03H 1/0244* (2013.01); *G03H 1/0256* (2013.01); *G03H 1/04* (2013.01); *G03H 2001/0268* (2013.01); *G03H 2210/30* (2013.01); CPC ....... *G03H 2240/23* (2013.01); *G03H 2250/36* (2013.01); *G03H 2250/42* (2013.01)

(58) Field of Classification Search
USPC ............... 359/27, 28, 2–12, 19–22, 30–35, 359/563–576; 430/2, 5, 322
See application file for complete search history.

(56) References Cited

U.S. PATENT DOCUMENTS

| 3,815,969 A | 6/1974 | Fletcher et al. |
| 7,813,016 B2 | 10/2010 | Pu et al. |
| 2008/0138013 A1* | 6/2008 | Parriaux .................. 385/37 |

(Continued)

FOREIGN PATENT DOCUMENTS

| JP | 06-028672 A | 2/1994 |
| JP | 2008-058209 A | 3/2008 |
| KR | 20070075002 A | 7/2007 |

OTHER PUBLICATIONS

Holographic Surface Gratings in Iron-doped Lithium Niobate, Applied Physics Letters 79, 901 (2001); Doi: 10.1063/1.1394176; S.S. Sarkisov, M.J. Curley, N. V. Kukhtarev, A. Fields, G. Adamovsky, C.C. Smith, and L.E. Moore.

(Continued)

*Primary Examiner* — Ricky Mack
*Assistant Examiner* — Mustak Choudhury
(74) *Attorney, Agent, or Firm* — Harness, Dickey & Pierce, PLC

(57) ABSTRACT

A holography device may include a light reaction layer configured to react with light to form and remove a diffraction grating, and a metal thin film on the light reaction layer. When first light is incident on the metal thin film while the grating is formed in the light reaction layer, surface plasmon formed on the metal thin film may be diffracted so as to output a holography image. A method of processing a holography image may include recording the image on a holography device by irradiating first light to a light reaction layer to form a diffraction grating, outputting the image by irradiating second light to a metal thin film on the light reaction layer to diffract surface plasmon formed on the metal thin film, and deleting the image from the holography device by irradiating third light to the light reaction layer to remove the grating.

21 Claims, 10 Drawing Sheets

(56) References Cited

U.S. PATENT DOCUMENTS

2009/0067018 A1    3/2009  Pu et al.
2012/0008482 A1*   1/2012  Bablumyan et al. .......... 369/103

OTHER PUBLICATIONS

Observation of Surface-plasmon-polariton Transmission Through a Silver Film Sputtered on a Photorefractive Substrate, Journal of Applied Physics 102, 113109 (2007), Doi: 10.1063/1.2821310, Jing Chen, Yudong Li, Wenqiang Lu, Jiwel Qi, Guoxin Cui, Hongbing Liu, Jinqjun Xu, and Qian Sun.

Surface-Plasmon Holography with White-Light Illumination, Miyu Ozaki et al, Science 332, 218 (2011), Doi: 10.1126/science 1201045.

Evanescent-wave Holography by Use of Surface-plasmon Resonance, Apr. 10, 1997/vol. 36, No. 11/Applied Optics, Shoji Maruo, Osamu Nakamura, and Satoshi Kawata.

* cited by examiner

US 9,122,244 B2

HOLOGRAPHY DEVICES, THREE-DIMENSIONAL IMAGE DISPLAY APPARATUSES INCLUDING THE SAME, AND METHODS OF PROCESSING HOLOGRAPHY IMAGES

CROSS-REFERENCE TO RELATED APPLICATION(S)

This application claims priority from Korean Patent Application No. 10-2011-0123665, filed on Nov. 24, 2011, in the Korean Intellectual Property Office (KIPO), the entire contents of which are incorporated herein by reference.

BACKGROUND

1. Field

Example embodiments relate to holography devices using surface plasmons. Example embodiments also relate to three-dimensional (3D) image display apparatuses including holography devices. Additionally, example embodiments relate to methods of processing holography images.

2. Description of Related Art

Three-dimensional (3D) image display apparatuses that realistically and effectively display an image are increasingly required in various fields, such as medical images, games, advertisements, education, and the military. Accordingly, as a method of displaying a 3-dimensional image, research has been widely conducted into a holography image method or a stereoscopic method.

According to a holography image method, a coherent signal obtained by overlapping a light incident from an object and a coherent reference light may be recorded and reproduced. The holography image method may be ideal for realizing a 3-dimensional image. Since Dennis Gabor, an English scientist, developed the first hologram in the 1940s, research into holography image has been conducted by many scientists. Recently, a variety of holography image techniques have been developed for displaying, for example, a pulsed laser hologram for a dynamic image, a stereohologram for a wide spatial view and wide viewing angle, an embossed hologram for mass production, a natural color hologram displaying natural colors, a digital hologram using a digital imaging device, and/or an electronic holography image. The electronic holography image used since 1990 may be an imaging technique of the next generation. According to the electronic holography image, an image of an object may be reproduced on a display device by scanning an image of the object in pixels to form a hologram, sampling and transmitting data contained in the hologram, and/or reproducing the hologram from the transmitted data.

A typical holography device for reproducing a holography image may use a photopolymer in order to form diffraction gratings. With regard to a photopolymer, since the height of a portion that is hardened by receiving light may be reduced, a holography image to be recorded may be recorded according to a thickness difference of the photopolymer. When a thickness difference of a photopolymer that is hardened occurs once, the current state may never be changed again. Accordingly, a holography device including a photopolymer may reproduce only a single holography image.

SUMMARY

Example embodiments may provide holography devices that are capable of recording and/or deleting holography images.

Example embodiments may provide three-dimensional (3D) image display apparatuses that include holography devices that are capable of recording and/or deleting holography images.

Example embodiments may provide methods of processing holography images by using holography devices.

According to example embodiments, a holography device may include a light reaction layer configured to react with light so as to form and remove a diffraction grating, and/or a metal thin film on the light reaction layer. When first light is incident on the metal thin film while the diffraction grating is formed in the light reaction layer, surface plasmon formed on the metal thin film may be diffracted so as to output a holography image.

According to example embodiments, the light reaction layer may be configured to react with second light that is not spatially uniform so as to form the diffraction grating, and/or the light reaction layer may be configured to react with third light that is spatially uniform so as to remove the diffraction grating.

According to example embodiments, the second light and the third light may have a same incident direction.

According to example embodiments, the second light and the third light may have an incident direction that is opposite to an incident direction of the first light.

According to example embodiments, the second light and the third light may be incident through the light reaction layer.

According to example embodiments, a first uneven portion corresponding to the diffraction grating may be formed in the light reaction layer by the second light, and/or the first uneven portion may be removed from the light reaction layer by the third light.

According to example embodiments, the light reaction layer may be formed of material that reacts with the light to cause piezoelectricity.

According to example embodiments, the light reaction layer may include at least one of ZnO doped with Er, Fe:LiNbO$_3$, BSO, BGO, BTO, PZT, and a light reaction polymer.

According to example embodiments, the holography device may further include a buffer layer configured to prevent deformation of the light reaction layer from affecting another layer.

According to example embodiments, the buffer layer may include at least one of gas, fluid, and flexible solid.

According to example embodiments, the buffer layer may be between the light reaction layer and the metal thin film.

According to example embodiments, the metal thin film may be between the buffer layer and the light reaction layer.

According to example embodiments, a second uneven portion may be formed in the metal thin film to correspond to the first uneven portion formed in the light reaction layer.

According to example embodiments, the holography device may further include a prism on the metal thin film. The prism may be configured to adjust an inclination angle of the first light.

According to example embodiments, the holography device may further include an electrode below the light reaction layer. The electrode may be configured to apply a voltage to the light reaction layer.

According to example embodiments, a three-dimensional (3D) image display apparatus may include a light unit that includes a plurality of light source units, a holography optical unit including a plurality of holography devices, and/or a display panel configured to modulate light reproduced by the holography optical unit according to an image signal. The holography optical unit may be configured to reproduce the light corresponding to a plurality of holography images that are spatially spaced apart from each other when light is incident on the light unit.

According to example embodiments, a method of processing a holography image of a holography device may include recording the holography image on the holography device by irradiating first light to a light reaction layer of which physical properties are changed by light in order to form a diffraction grating in the light reaction layer, outputting the holography image from the holography device by irradiating second light to a metal thin film on the light reaction layer in order to diffract surface plasmon formed in the metal thin film, and/or deleting the holography image from the holography device by irradiating third light to the light reaction layer to remove the diffraction grating.

According to example embodiments, the first light may not be spatially uniform, and/or the second light may be spatially uniform.

According to example embodiments, an uneven portion corresponding to the diffraction grating may be formed in the light reaction layer by the first light, and/or the uneven portion may be removed from the light reaction layer by the third light.

According to example embodiments, the light reaction layer may be formed of material that reacts with light in order to cause piezoelectricity.

According to example embodiments, the light reaction layer may include at least one of ZnO doped with Er, Fe:LiNbO$_3$, BSO, BGO, BTO, PZT, and a light reaction polymer.

According to example embodiments, the uneven portion may be formed in the metal thin film.

According to example embodiments, the holography device may further include a prism array on the metal thin film. The prism array may be configured to adjust an inclination angle of the first light.

According to example embodiments, a holography device may include a light reaction layer, a buffer layer on the light reaction layer, and/or a metal thin film on the buffer layer. The light reaction layer may be configured to react with first light so as to form a diffraction grating in the light reaction layer. When second light is incident on the metal thin film while the diffraction grating is formed in the light reaction layer, surface plasmon formed on the metal thin film may be diffracted so as to output a holography image.

According to example embodiments, the holography device may further include a prism or a prism array on the metal thin film. The prism may be configured to adjust an inclination angle of the second light or the prism array may be configured to adjust an inclination angle of the second light.

According to example embodiments, a holography device may include a light reaction layer, a metal thin film on the light reaction layer, and/or a buffer layer on the metal thin film. The light reaction layer may be configured to react with first light so as to form a diffraction grating in the light reaction layer. When second light is incident on the metal thin film while the diffraction grating is formed in the light reaction layer, surface plasmon formed on the metal thin film may be diffracted so as to output a holography image.

According to example embodiments, the holography device may further include a prism on the buffer layer. The prism may be configured to adjust an inclination angle of the second light.

According to example embodiments, the holography device may further include a prism array on the buffer layer. The prism array may be configured to adjust an inclination angle of the second light.

According to example embodiments, the light reaction layer may be formed of Mott material.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
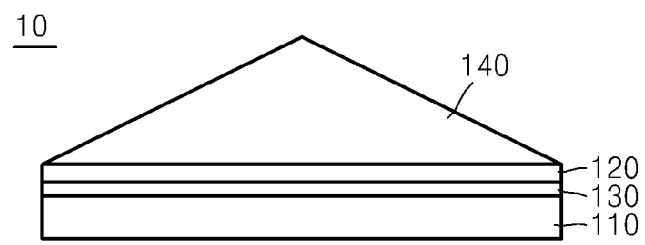
FIG. 1 is a cross-sectional view of a holography device according to example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

A holography device according to example embodiments may record a recording light, in which an object light containing information about an object and a reference light for reference interfere with each other, and then may output a holography image when the reference light is incident on the holography device.

FIG. 1 is a cross-sectional view of a holography device 10 according to example embodiments. Referring to FIG. 1, the holography device 10 includes a light reaction layer 110 of which physical properties are changed by light and a metal thin film 120 on the light reaction layer 110.

The light reaction layer 110 may be formed of a material of which physical properties are changed by light to form and remove a diffraction grating. When light that is not spatially uniform is incident on the light reaction layer 110, a diffraction grating may be formed on the light reaction layer 110. When light that is spatially uniform is incident on the light reaction layer 110, the diffraction grating may be removed from the light reaction layer 110. For example, the light reaction layer 110 may be formed of a material of which a volume varies according to an intensity of light incident thereon. A variation in volume of the light reaction layer 110 is dependent upon an intensity of light incident thereon. Thus, a strong electric field may be formed on a region of the light reaction layer 110, on which light having a strong intensity is incident, and thus, a variation in volume of the region may be great. In addition, a weak electric field may be formed on a region of the light reaction layer 110, on which light having a weak intensity is incident, and thus, a variation in volume of the region may be small.

Accordingly, since light that is not spatially uniform is incident on the light reaction layer 110, a volume difference between regions of the light reaction layer 110 may be generated so that an uneven portion may be formed in the light reaction layer 110. The uneven portion may correspond to the diffraction grating. In addition, when light that is spatially uniform is incident on the light reaction layer 110, the same electric field is formed on an entire region of the light reaction layer 110 so that the volume of the light reaction layer 110 may be uniform. Accordingly, since the volume difference is removed, the uneven portion, that is, the diffraction grating formed on the light reaction layer 110, may be removed.

The light reaction layer 110 may be formed of a material that reacts to light to cause piezoelectricity. A spatial intensity difference between light beams that are incident on the light reaction layer 110 may cause a spatial intensity difference between electrical fields formed in the light reaction layer 110, thereby generating a local voltage on the light reaction layer 110. In addition, the volume of a piezoelectric material is changed by the generated local voltage. The light reaction layer 110 may be formed of, for example, zinc oxide (ZnO) doped with erbium (Er), a photorefractive crystal such as iron-doped lithium niobate crystal (Fe:LiNbO$_3$), Bi$_{12}$SiO$_{20}$ (BSO), Bi$_{12}$GeO$_{20}$ (BGO), Bi$_{12}$TiO$_{20}$ (BTO), lead zirconate titanate (PZT), or the like, and/or a light reaction polymer, or the like.

The metal thin film 120 may be on the light reaction layer 110. According to the present embodiment, the expression "an element is on a first layer" means that the element contacts the first layer or the element is on the first layer and is spaced apart from the first layer. FIG. 1 shows a case where the metal thin film 120 is spaced apart from the light reaction layer 110. The metal thin film 120 and the light reaction layer 110 may be spaced apart from each other by several microns or less. Thus, surface plasmon formed on a surface of the metal thin film 120 is diffracted by diffraction gratings of the light reaction layer 110.

The metal thin film 120 may be formed of metal material in which surface plasmon is easily formed. For example, the metal thin film 120 may be formed of metal material, such as gold (Au), silver (Ag), aluminum (Al), or the like. In addition, metal material, such as copper (Cu), lead (Pb), indium (In), tin (Sn), cadmium (Cd), or the like, may be used. The metal thin film 120 may have a thickness of several hundreds of nanometers or less.

When light is incident on the metal thin film 120, if a relationship of the incident light, the light reaction layer 110, and the metal thin film 120 satisfies a condition for generating surface plasmon, surface plasmon is generated at an interface between the light reaction layer 110 and the metal thin film 120. Surface plasmon refers to charge density oscillation that is generated as a result of exciting free electrons in the metal thin film 120 by energy of the incident light as a mode of an electric field proceeding along the interface between the metal thin film 120 and the light reaction layer 110. The surface plasmon is a transverse magnetic polarized wave that exhibits a maximum value at the interface between the metal thin film 120 and the light reaction layer 110 and exponentially reduces in a direction perpendicular to the surface of the metal thin film 120.

In addition, the holography device 10 may further include a buffer layer 130 that prevents a change in physical properties of the light reaction layer 110 from affecting the metal thin film 120. The buffer layer 130 is between the light reaction layer 110 and the metal thin film 120. Thus, when an uneven portion is formed in the light reaction layer 110, a surface of the buffer layer 130, which contacts the light reaction layer 110, is deformed to have a complementary shape to the uneven portion formed in the light reaction layer 110, but an opposite surface of the buffer layer 130 is not deformed.

The buffer layer 130 may be formed of gas or liquid of which a volume is easily changed or a flexible solid. In order to obtain the liquidity of the buffer layer 130, a spacer (not shown) and a reservoir (not shown) for storing a portion of the buffer layer 130 may be further between the metal thin film 120 and the light reaction layer 110.

In addition, the holography device 10 may further include a prism 140 for adjusting an incident angle of light that is incident thereon. The prism 140 may be on the metal thin film 120. If light is incident at an inclination angle for generating surface plasmon without the prism 140, the holography device 10 does not have to include the prism 140.

The size of the prism 140 is proportional to the area of the holography device 10. Thus, in order to manufacture a holography device having a large area, a prism having a large size needs to be used. However, in order to prevent an increase in volume of the holography device 10, a prism array including a plurality of aligned prisms may be used.

Figure 2:
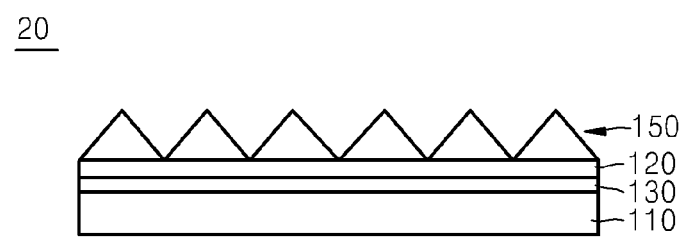
FIG. 2 is a cross-sectional view of a holography device including a prism array according to example embodiments.

FIG. 2 is a cross-sectional view of a holography device 20 including a prism array 150 according to example embodiments. As shown in FIG. 2, the holography device 20, which has a small volume and large area, may be obtained by using the prism array 150.

In addition, the holography device 20 may further include a dielectric layer in order to satisfy a condition for generating surface plasmon.

Figure 3:
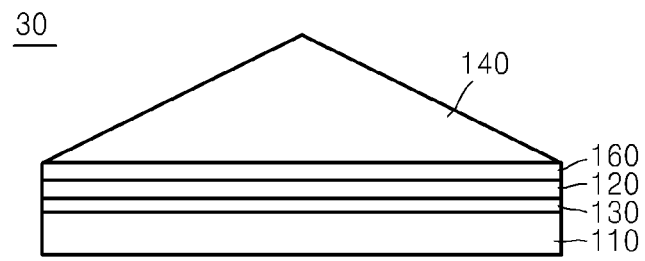
FIG. 3 is a cross-sectional view of a holography device including a dielectric layer according to example embodiments.

FIG. 3 is a cross-sectional view of a holography device 30 including a dielectric layer 160 according to example embodiments. As shown in FIG. 3, the dielectric layer 160 may be on the metal thin film 120. A refractive index of the dielectric layer 160 may compensate for a refractive index of the light reaction layer 110 to generate surface plasmon on a surface of the metal thin film 120 and may vary according to the refractive index of the light reaction layer 110. A material of the dielectric layer 160 is not particularly limited. For example, when surface plasmon is generated on the surface of the metal thin film 120 by using the light reaction layer 110 only, the holography device 30 does not have to include the dielectric layer 160.

In order to easily manufacture the holography device, a substrate may be further required.

Figure 4:
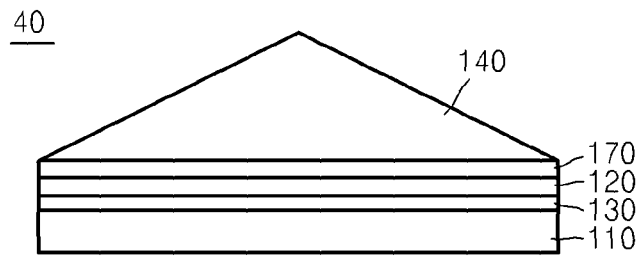
FIG. 4 is a cross-sectional view of a holography device including a substrate according to example embodiments.

FIG. 4 is a cross-sectional view of a holography device 40 including a substrate 170 according to example embodiments. The substrate 170 may be formed of a transparent material and may include, for example, a glass substrate, a plastic substrate, or the like. As shown in FIG. 4, the holography device 40 may be manufactured by sequentially stacking the metal thin film 120, the buffer layer 130, and the light reaction layer 110 below the substrate 170, and stacking the prism 140 on the substrate 170. If desired, the prism 140 does not have to be used.

The volume of the above-described light reaction layer of the holography device may be changed according to an intensity of light even though a voltage is not applied to the light reaction layer. However, the volume of the light reaction layer may be effectively changed when a voltage is applied to the light reaction layer.

Figure 5:
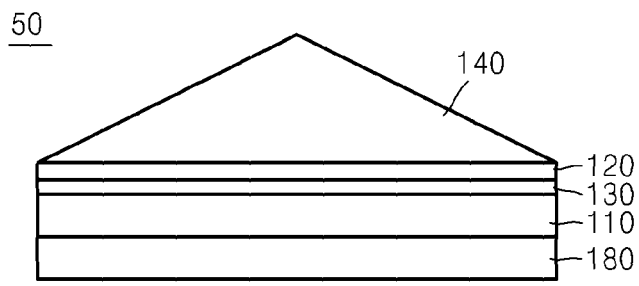
FIG. 5 is a cross-sectional view of a holography device including a transparent electrode according to example embodiments.

FIG. 5 is a cross-sectional view of a holography device 50 including a transparent electrode 180 according to example embodiments. As shown in FIG. 5, in order to apply a voltage to the light reaction layer 110, the transparent electrode 180 may be further below the light reaction layer 110. In this case, the term 'below' refers to a case where the transparent electrode 180 is on a lower surface of the light reaction layer 110 or a case where the transparent electrode 180 is below and spaced apart from the light reaction layer 110.

The transparent electrode 180 may be formed of, but is not limited to, aluminum (Al), gold (Au), indium oxide tin (ITO), or the like. The transparent electrode 180 may be any electrode formed of a transparent material. In this case, the metal thin film 120 may function as another electrode. Thus, when a voltage is applied to the metal thin film 120 and the transparent electrode 180, an electric field is formed on the light reaction layer 110. According to an intensity of light incident on the light reaction layer 110, an intensity of the electric field formed on the light reaction layer 110 may vary so that the volume of the light reaction layer 110 may vary. In addition, a high voltage may be applied to the metal thin film 120 and the transparent electrode 180 so that the volume of the light reaction layer 110 may be uniform.

A holography device may include two or more combinations of the prism array 150, the dielectric layer 160, the substrate 170, and the transparent electrode 180.

FIGS. 6A through 6D are diagrams for describing methods of processing holography images via the holography device 10 of FIG. 1 according to example embodiments.

Figure 6A:
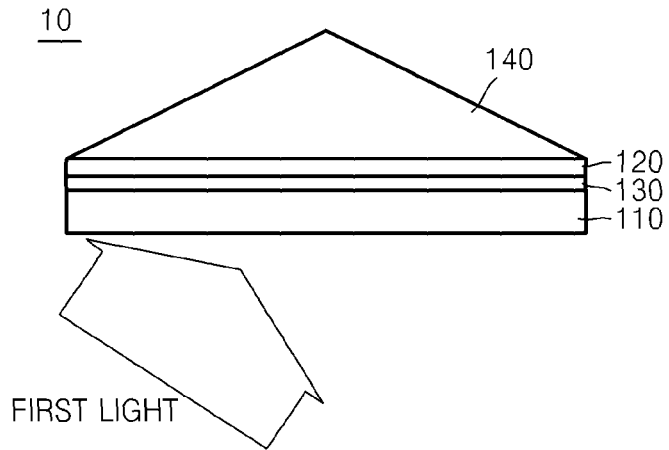
FIGS. 6A through 6D are diagrams for describing methods of processing holography images via the holography device of FIG. 1 according to example embodiments.

As shown in FIG. 6A, first light FIRST LIGHT, in which object light containing information about an object and reference light for a reference interfere with each other, is incident on the light reaction layer 110 of the holography device 10. The first light FIRST LIGHT may be incident on a lower surface of the light reaction layer 110. An intensity of the first light FIRST LIGHT may vary with position and/or time.

Figure 6B:
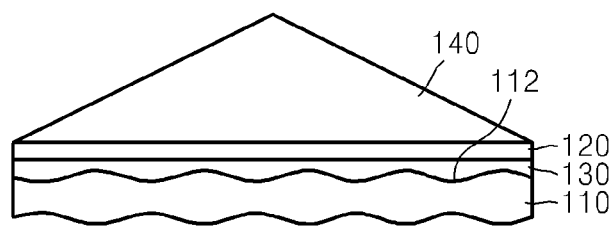

As shown in FIG. 6B, when the first light FIRST LIGHT is incident on the light reaction layer 110, an electric field of which an intensity varies according to an intensity of the first light FIRST LIGHT is formed on the light reaction layer 110. In addition, the electric field having a variable intensity may change the volume of the light reaction layer 110. Due to a variation in the volume of the light reaction layer 110, an uneven portion 112 is formed on the light reaction layer 110. Due to the uneven portion 112, a holography image is recorded in the light reaction layer 110. Although the uneven portion 112 is formed in the light reaction layer 110, since the buffer layer 130 prevents the uneven portion 112 from affecting other layers, the metal thin film 120 maintains its original shape.

Figure 6C:
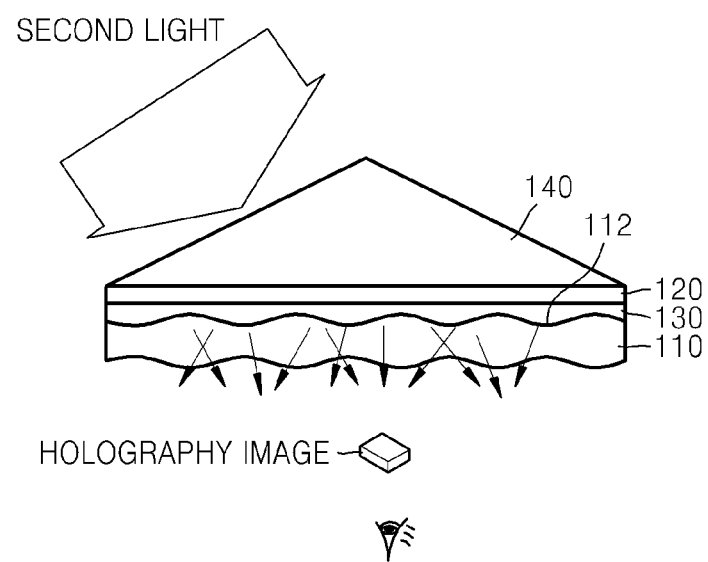

As shown in FIG. 6C, second light SECOND LIGHT is incident on the metal thin film 120 of the holography device 10. The second light SECOND LIGHT may be reference light. The reference light may be white light or light having a wavelength that may or may not be predetermined. The second light SECOND LIGHT may be incident on an upper surface of the metal thin film 120. Thus, the first light FIRST LIGHT and the second light SECOND LIGHT have opposite inclination directions. When the second light SECOND LIGHT is incident on the metal thin film 120, surface plasmon is generated between the metal thin film 120 and the light reaction layer 110 under a condition, such as an inclination angle of the second light SECOND LIGHT, a refractive index of the metal thin film 120 and the light reaction layer 110, and the like. In addition, surface plasmon is diffracted by the uneven portion 112 of the light reaction layer 110 so as to output a holography image from the holography device 10 through the light reaction layer 110. The uneven portion 112 may correspond to a diffraction grating for diffracting light.

Figure 6D:
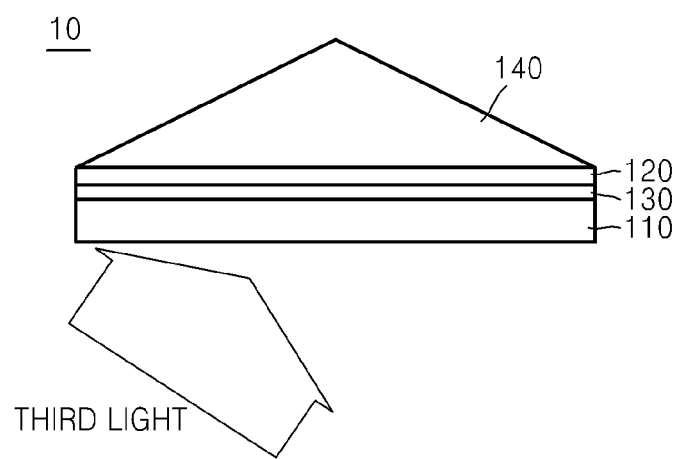

As shown in FIG. 6D, third light THIRD LIGHT for removing the effect of the first light FIRST LIGHT is incident on the light reaction layer 110 of the holography device 10. The third light THIRD LIGHT may be incident on the lower surface of the light reaction layer 110 and may have an intensity that is spatially uniform. Since the intensity of the third light THIRD LIGHT is spatially uniform, a uniform electric field that is spatially uniform may be formed in the light reaction layer 110. Thus, the diffraction grating is removed from the light reaction layer 110 by removing the uneven portion 112. Accordingly, the holography image is erased by removing the diffraction grating.

As described above, since the light reaction layer 110 may be formed of a material of which a volume varies according to an intensity of light, an uneven portion may be formed or removed. Thus, a holography image may be recorded and erased. Since the holography image is recorded and erased, a single holography device 10 may produce various images and a moving picture.

FIGS. 6A through 6D show methods of processing holography images via the holography device 10 of FIG. 1 according to example embodiments.

A holography image is recorded, reproduced, and erased in the holography devices 10, 20, 30, 40, and 50 of FIGS. 2 through 5 by using the same method described above with reference to FIGS. 6A through 6D. A holography device including two or more combinations of a prism array, a dielectric layer, a substrate, and a metal thin film may use the same method described above with reference to FIGS. 6A through 6D.

With regard to the above-described holography device, a diffraction grating is formed in a light reaction layer. However, when a diffraction grating is also formed in a metal thin film, a diffracting efficiency of surface plasmon may be increased.

Figure 7:
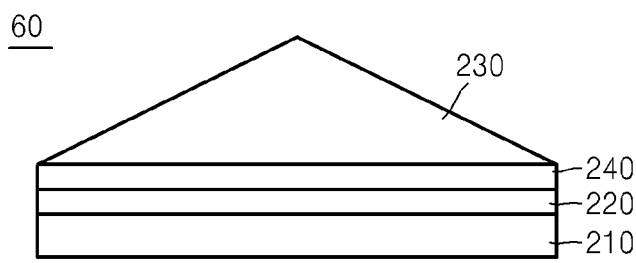
FIG. 7 is a cross-sectional view of a holography device according to example embodiments.

FIG. 7 is a cross-sectional view of a holography device 60 according to example embodiments. Referring to FIG. 7, the holography device 60 includes a light reaction layer 210 of which physical properties are changed by light and a metal thin film 220 that is on the light reaction layer 210 and whose shape is changed according to a change in physical properties of the light reaction layer 210.

The light reaction layer 210 may be formed of a material of which physical properties are changed by light to form and remove a diffraction grating. When light that is not spatially uniform is incident on the light reaction layer 210, a diffraction grating may be formed on the light reaction layer 210. When light that is spatially uniform is incident on the light reaction layer 210, the diffraction grating may be removed from the light reaction layer 210. For example, the light reaction layer 210 may be formed of a material of which a volume varies according to an intensity of light incident thereon. A variation in volume of the light reaction layer 210 is dependent upon an intensity of light incident thereon. Thus, a strong electric field may be formed on a region of the light reaction layer 210, on which light having a strong intensity is incident, and thus, a variation in volume of the region may be great. In addition, a weak electric field may be formed on a region of the light reaction layer 210, on which light having a weak intensity is incident, and thus, a variation in volume of the region may be small. Accordingly, since light that is not spatially uniform is incident on the light reaction layer 210, a volume difference between regions of the light reaction layer 210 may be generated so that an uneven portion may be formed in the light reaction layer 210. The uneven portion may correspond to the diffraction grating. In addition, when light that is spatially uniform is incident on the light reaction layer 210, the same electric field is formed on an entire region of the light reaction layer 210 so that the volume of the light reaction layer 210 may be uniform. Accordingly, since the volume difference is removed, the uneven portion, that is, the diffraction grating formed on the light reaction layer 210 may be removed.

The light reaction layer 210 may be formed of a material that reacts light to cause piezoelectricity. For example, the light reaction layer 210 may be formed of, for example, ZnO doped with Er, a photorefractive crystal such as Fe:LiNbO$_3$, BSO, BGO, BTO, PZT, or the like, and/or a light reaction polymer, or the like.

The metal thin film 220 may be on the light reaction layer 210. The metal thin film 220 may be formed of metal material in which surface plasmon is easily formed. For example, the metal thin film 220 may be formed of metal material, such as gold (Au), silver (Ag), aluminum (Al), or the like. In addition, metal material, such as copper (Cu), lead (Pb), indium (In), tin (Sn), cadmium (Cd), or the like, may be used. The metal thin film 220 may have a thickness of several hundreds of nanometers or less and may be easily deformed. Thus, when an uneven portion is formed in the light reaction layer 210, an uneven portion is also formed on the metal thin film 220 so as to correspond to the uneven portion of the light reaction layer 210. When the uneven portion is removed from the light reaction layer 210, the uneven portion is also removed from the metal thin film 220.

In addition, the holography device 60 may further include a prism 230 for adjusting an incident angle of light that is incident thereon. The prism 230 may be on the metal thin film 220. If light is incident at an inclination angle for generating surface plasmon without the prism 230, the holography device 60 does not have to include the prism 230.

In addition, the holography device 60 may further include a buffer layer 240 that prevents deformation of the metal thin film 220 from affecting the prism 230. The buffer layer 240 may be on the metal thin film 220. Thus, when an uneven portion is formed in the light reaction layer 210, a surface of the buffer layer 240, which contacts the light reaction layer 210, is deformed to have a complementary shape to the uneven portion formed on the light reaction layer 210, but an opposite surface of the buffer layer 240 is not deformed.

The buffer layer 240 may be formed of gas or liquid of which a volume is easily changed or a flexible solid. In order to facilitate the liquidity of the buffer layer 240, a spacer (not shown) for supporting the buffer layer 240 and a reservoir (not shown) for storing a portion of the buffer layer 240 may be included. If the holography device 60 does not require the prism 230, the holography device 60 does not have to include the buffer layer 240.

If desired, a holography device may further include at least one of a dielectric layer on the metal thin film 220, for satisfying a condition for generating surface plasmon, a prism array for adjusting an inclination angle of light incident on an upper surface of the buffer layer 240, a transparent electrode on a lower surface of the light reaction layer 210, for forming an electric field on the light reaction layer 210, and a substrate on an upper surface of the buffer layer 240, for easily manufacturing the holography device.

FIGS. 8A through 8D are diagrams for describing methods of the holography device 60 of FIG. 7, processing holography images, according to example embodiments.

Figure 8A:
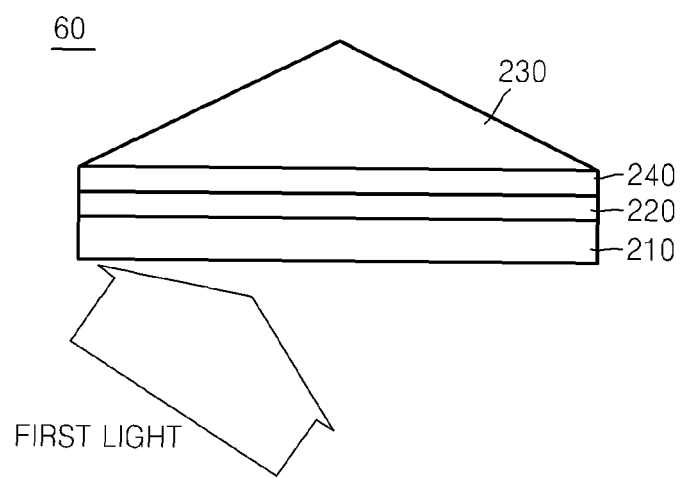
FIGS. 8A through 8D are diagrams for describing methods of the holography device of FIG. 7, processing holography images, according to example embodiments.
Figure 8B:
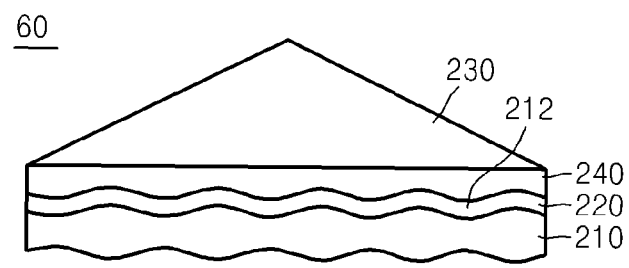

As shown in FIG. 8A, first light FIRST LIGHT, in which object light containing information about an object and reference light for reference interfere with each other, is incident on the light reaction layer 210 of the holography device 60. The first light FIRST LIGHT may be incident on a lower surface of the light reaction layer 210. An intensity of the first light FIRST LIGHT may vary with position and/or time. As shown in FIG. 8B, when the first light FIRST LIGHT is incident on the light reaction layer 210, a volume of the light reaction layer 210 is changed according to the intensity of the first light FIRST LIGHT so as to form an uneven portion 212. In addition, due to the uneven portion 212 of the light reaction layer 210, an uneven portion 222 may be also formed on the metal thin film 220 so as to correspond to the uneven portion 212. In the presence of the uneven portions 212 and 222, a holography image is recorded in both the light reaction layer 210 and the metal thin film 220. The uneven portions 212 and 222 may function as diffraction gratings for diffracting light.

Figure 8C:
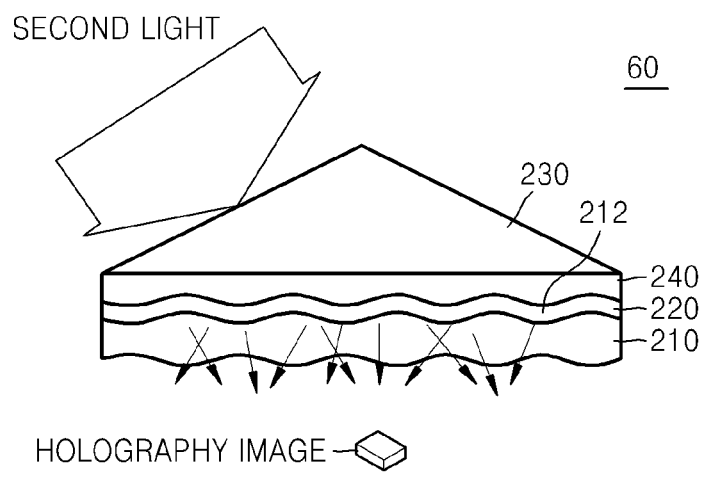

As shown in FIG. 8C, second light SECOND LIGHT is incident on the metal thin film 220 of the holography device 60. The second light SECOND LIGHT may be reference light. The second light SECOND LIGHT may be incident on an upper surface of the metal thin film 220. Thus, the first light FIRST LIGHT and the second light SECOND LIGHT have opposite inclination directions. When the second light SECOND LIGHT is incident on the metal thin film 220, surface plasmon is generated on a surface of the metal thin film 220 under a condition, such as an inclination angle of the second light SECOND LIGHT, a refractive index of the metal thin film 220 and the light reaction layer 210, and the like. In addition, surface plasmon is diffracted by the uneven portions 212 and 222 so as to output a holography image from the holography device 60. The holography image is output outside the holography device 60 through a lower surface of the light reaction layer 210.

Figure 8D:
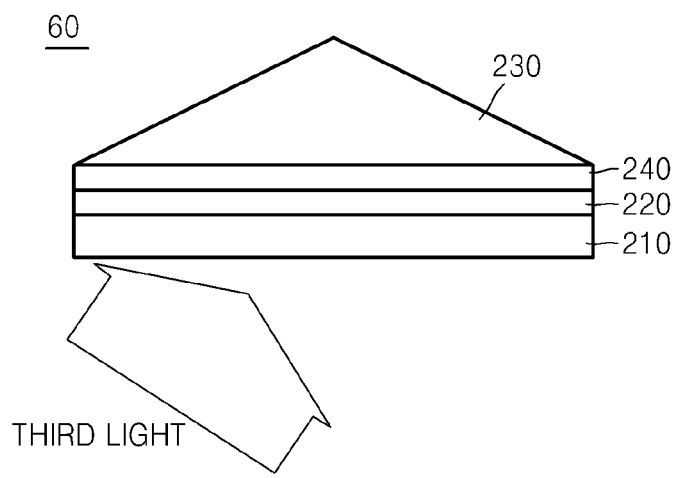

As shown in FIG. 8D, third light THIRD LIGHT for removing the effect of the first light FIRST LIGHT is incident on the light reaction layer 210 of the holography device 60. The third light THIRD LIGHT may be incident on a lower surface of the light reaction layer 210 and may have an intensity that is spatially uniform. Since the intensity of the third light THIRD LIGHT is spatially uniform, a uniform electric field that is spatially uniform may be formed in the light reaction layer 210. Thus, the uneven portion 212 formed on the light reaction layer 210 is removed. Since the uneven portion 212 of the light reaction layer 210 is removed, the uneven portion 222 of the metal thin film 220 that contacts the light reaction layer 210 is also removed.

As described above, since the light reaction layer 210 and the metal thin film 220 contact each other, the light reaction layer 210 is deformed by light, and accordingly the metal thin film 220 is also deformed. A thickness difference of the light reaction layer 210, which may be required for diffracting surface plasmon, may be several tens of nanometers. In addition, due to the deformation of the light reaction layer 210 and the metal thin film 220, although a change of volume of the light reaction layer 210 is slight, surface plasmon may be diffracted. Thus, surface plasmon may be diffracted with high efficiency.

When the holography device 60 of FIG. 7 includes at least one of a prism array, a dielectric layer, a substrate, and a transparent electrode, the holography device 60 may also use the same method as the method shown in FIGS. 8A through 8D.

Thus far, a method and device for forming diffraction grating by using a change in volume of a light reaction layer have been described. Alternatively, a diffraction grating may also be formed by using a diffractive index that is not limited to the above-described cases.

Figure 9:
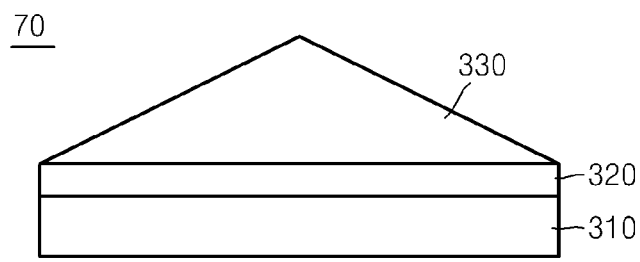
FIG. 9 is a cross-sectional view of a holography device according to example embodiments.

FIG. 9 is a cross-sectional view of a holography device 70 according to example embodiments.

Referring to FIG. 9, the holography device 70 includes a light reaction layer 310 of which physical properties are changed by light and a metal thin film 320 on the light reaction layer 310 and generating surface plasmon.

The light reaction layer 310 may be formed of a material whose refractive index varies according to an intensity of light incident thereon. A change in refractive index of the light reaction layer 310 is dependent upon an intensity of light incident thereon. Thus, when light that is not spatially uniform is incident on the light reaction layer 310, a difference in refractive index occurs in the light reaction layer 310 so as to function as a diffraction grating. In addition, when light that is spatially uniform is incident on the light reaction layer 310, a difference in refractive index of the light reaction layer 310 is removed so as to remove diffraction grating.

The light reaction layer 310 may be formed of Mott material (named for Sir Nevill Francis Mott). A refractive index of Mott material may vary according to a temperature thereof. Thus, the temperature of Mott material varies according to an intensity of light or a recording time of light and a change in temperature of Mott material causes a change in refractive index thereof, thereby forming diffraction grating. In addition, when light that is spatially uniform is incident on Mott material, a refractive index of Mott material may be uniformed. When Mott material is cooled, a refractive index of Mott material is unformed, thereby removing diffraction grating.

The metal thin film 320 may be on an upper surface of the light reaction layer 310. The metal thin film 320 may be formed of metal material in which surface plasmon is easily formed. For example, the metal thin film 320 may be formed of metal material, such as gold (Au), silver (Ag), aluminum (Al), or the like. In addition, metal material, such as copper (Cu), lead (Pb), indium (In), tin (Sn), cadmium (Cd), or the like, may be used.

The holography device 70 may further include a prism 330 for adjusting an incident angle of light that is incident thereon. The prism 330 may be on the metal thin film 320. If light is incident at an inclination angle for generating surface plasmon without the prism 330, the holography device 70 does not have to include the prism 330.

If desired, the holography device 70 may further include at least one of a dielectric layer on the metal thin film 320, for satisfying a condition for generating surface plasmon, a prism array for adjusting an inclination angle of light incident on an upper surface of the metal thin film 320, a transparent electrode on a lower surface of the light reaction layer 310, for forming an electric field on the light reaction layer 310, and a substrate for easily manufacturing the holography device.

FIGS. 10A through 10D are diagrams for describing methods of the holography device 70 of FIG. 9, processing holography images, according to example embodiments.

Figure 10A:
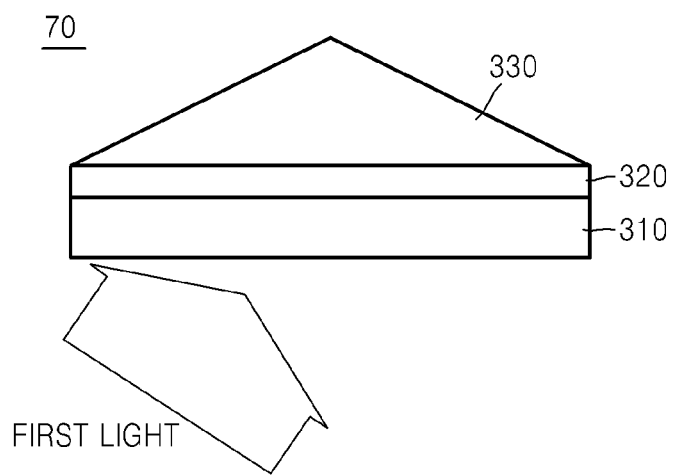
FIGS. 10A through 10D are diagrams for describing methods of the holography device of FIG. 9, processing holography images, according to example embodiments.
Figure 10B:
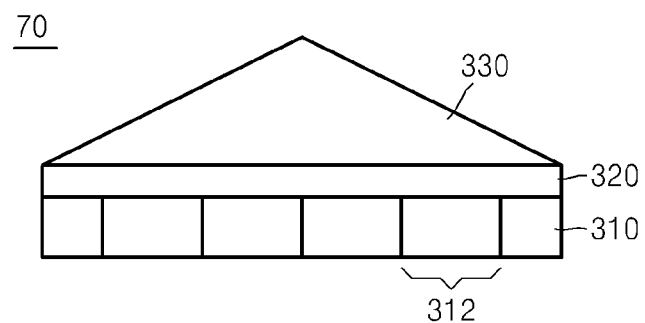

As shown in FIG. 10A, first light FIRST LIGHT, in which object light and reference light interfere with each other is incident on the light reaction layer 310 of the holography device 70. The first light FIRST LIGHT may be incident on a lower surface of the light reaction layer 310. An intensity of the first light FIRST LIGHT may vary with position and/or time. As show in FIG. 10B, when the first light FIRST LIGHT is incident on the light reaction layer 310, a refractive index of the light reaction layer 310 varies according to an intensity of the first light FIRST LIGHT to cause a refractive difference 312. A holography image is recorded according to the refractive difference 312. The refractive difference 312 corresponds to diffraction grating.

Figure 10C:
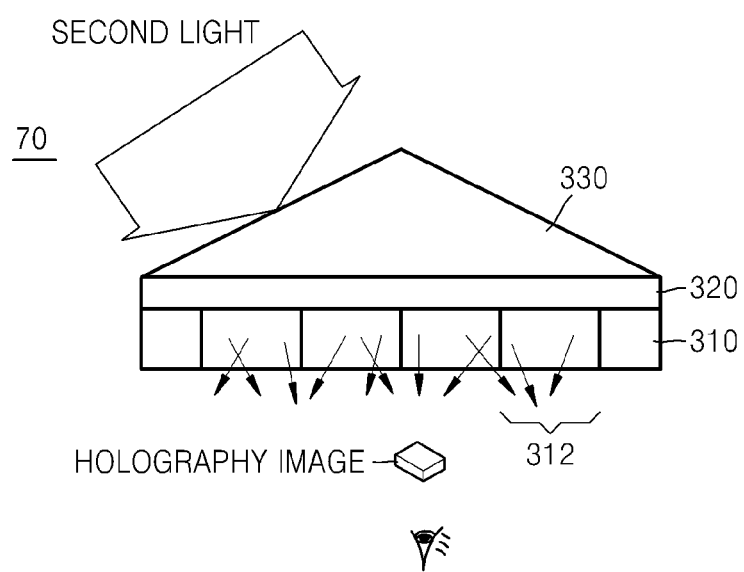

As shown in FIG. 10C, second light SECOND LIGHT is incident on the metal thin film 320 of the holography device 70. The second light SECOND LIGHT may be reference light. The second light SECOND LIGHT may be incident on an upper surface of the metal thin film 320. Thus, the first light FIRST LIGHT and the second light SECOND LIGHT have opposite inclination directions. When the second light SECOND LIGHT is incident on the metal thin film 320, surface plasmon is generated at an interface between the metal thin film 320 and the light reaction layer 310. In addition, surface plasmon is diffracted by diffraction grating of the light reaction layer 310 so as to output a holography image from the holography device 70. Light corresponding to the holography image is output outside the holography device 70 through a lower surface of the light reaction layer 310.

Figure 10D:
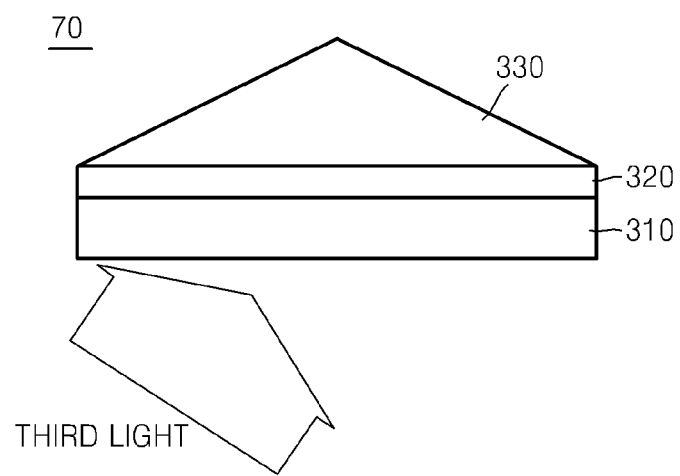

As shown in FIG. 10D, third light THIRD LIGHT for removing the effect of the first light FIRST LIGHT is incident on the light reaction layer 310 of the holography device 70. The third light THIRD LIGHT may be incident on a lower surface of the light reaction layer 310 and may have an intensity that is spatially uniform. Since the intensity of the third light THIRD LIGHT is spatially uniform, temperatures of all portions of the light reaction layer 310 are the same. In addition, due to the same temperature, a refractive index of the light reaction layer 310 is uniform, and the recorded holography image is deleted. When a refractive difference acts as diffraction grating, the holography image may be deleted by cooling the light reaction layer 310.

When the holography device 70 of FIG. 9 includes at least one of a prism array, a dielectric layer, a transparent electrode, and a substrate, the holography device 70 may use the same methods as the methods of recording, reproducing, and deleting a holography image, shown in FIGS. 10A through 10D.

The holography devices 10, 20, 30, 40, 50, 60, and 70 may be used in a three-dimensional (3D) image display apparatus.

Figure 11:
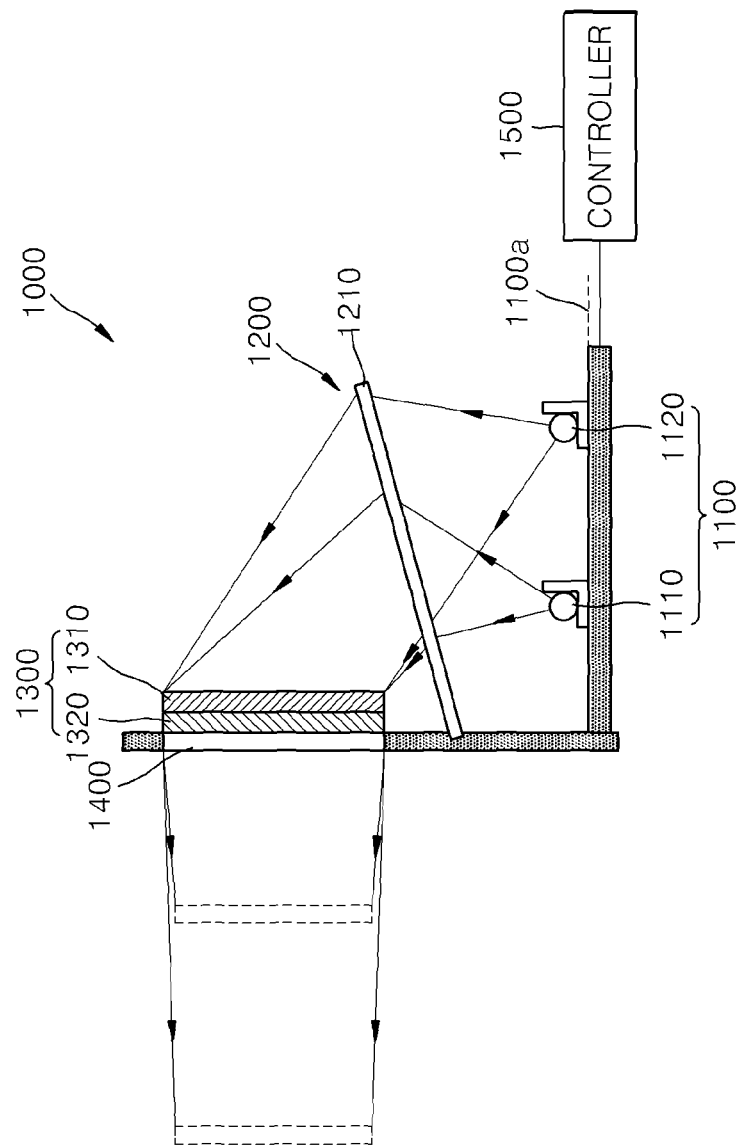
FIG. 11 is a schematic diagram of a three-dimensional (3D) image display apparatus according to example embodiments.

FIG. 11 is a schematic diagram of a 3D image display apparatus 1000 according to example embodiments. Referring to FIG. 11, the 3D image display apparatus 1000 includes a light unit 1100, an optical path converting unit 1200, a holography optical unit 1300, and a display panel 1400. In addition, the 3D image display apparatus 1000 may further include a controller 1500 for controlling driving of the light unit 1100 and the display panel 1400.

The light unit 1100 includes a plurality of light source units, for example, a first light source unit 1110 and a second light source unit 1120. The number of light source units included in the light unit 1100 is the same as a plurality of holography images formed by the holography optical unit 1300. Light sources used in the first and second light source units 1110 and 1120 may be a light emitting diode or a laser diode, or may be a general lamp for a projector. The first light source unit 1110 and the second light source unit 1120 are on/off driven by the controller 1500 and are alternately on/off driven in synchronization with time multiplexing driving of the display panel 1400.

The optical path converting unit 1200 is on an optical path between the light unit 1100 and the holography optical unit 1300 so that light beams emitted from the first and second light source units 1110 and 1120 may be incident on the holography optical unit 1300 at different inclination angles, respectively. For example, the optical path converting unit 1200 converts an optical path so that the light emitted from the first and second light source units 1110 and 1120 may have an angle of reference light used when a holography image is recorded on first and second holography devices 1310 and 1320. To this end, the optical path converting unit 1200 may include a Fresnel lens 1210 that is inclined with respect to an imaginary line 1100a connecting the first and second light source units 1110 and 1120 in a straight line. The Fresnel lens 1210 concentrates and collimates light. As shown in FIG. 11, since the Fresnel lens 1210 is inclined with respect to the imaginary line 1100a, the light beams emitted from the first and second light source units 1110 and 1120 may be incident on the Fresnel lens 1210 at different inclination angles, respectively. Thus, the light beams emitted from the first and second light source units 1110 and 1120 may have optical paths in which the light beams are incident on the holography optical unit 1300 through the Fresnel lens 1210. A degree in which the Fresnel lens 1210 is inclined with respect to the imaginary line 1100a may be appropriately determined in consideration of an angle of reference light when a hologram image is recorded on the first and second holography devices 1310 and 1320. With reference to FIG. 11, a case where the optical path converting unit 1200 includes a single Fresnel lens 1210 has been described. Alternatively, a plurality of path converting members on an optical path of the light beams emitted from the first and second light source units 1110 and 1120, and a plurality of condenser lenses may be used.

The holography optical unit 1300 may include the holography device 10, 20, 30, 40, 50, 60, or 70 in order to form a plurality of holography images that are spatially spaced apart from each other. The holography optical unit 1300 may include a plurality of holography devices including, for example, a first holography device 1310 and a second holography device 1320 on which a plurality of holography images are respectively recorded, in order to reproduce light for forming the holography images.

The display panel 1400 modulates light reproduced by the holography optical unit 1300 according to an image signal so as to form an image and may include, for example, a liquid crystal panel. Since the first and second holography devices 1310 and 1320 are behind the display panel 1400, the display panel 1400 may modulate light reproduce by the first and second holography devices 1310 and 1320 according to an image signal. The display panel 1400 divides an image of a single frame into a plurality of images and alternately realizes the images by using a time multiplexing method. For example, an image of a single frame is divided into two sub frame images. In addition, the display panel 1400 modulates light according to image signal corresponding to the two sub frame images.

The controller 1500 controls driving of the light unit 1100 and the display panel 1400. For example, when the display panel 1400 modulates light according to image signal corresponding to the two sub frame images, the controller 1500 may control on/off of the first and second light source units 1110 and 1120 in synchronization with the modulated light. As described above, when the first and second holography devices 1310 and 1320 include holographic polymer dispersed liquid crystal, the controller 1500 controls the first and second holography devices 1310 and 1320 to be switched in synchronization of a lighting signal and an image signal.

As described above, since a holography device in which surface plasmon is formed is used, a holography 3D image display apparatus may display various holography images and may also display a holography moving picture.

The holography device may record, reproduce, and delete a holography image. Thus, a single holography device may reproduce various images and may also reproduce a moving picture.

A 3D image display apparatus may be obtained by using the holography device.

While example embodiments have been particularly shown and described, it will be understood by those of ordinary skill in the art that various changes in form and details may be made therein without departing from the spirit and scope of the present invention as defined by the following claims.

What is claimed is:

1. A holography device, comprising:
a light reaction layer configured to react with light so as to form and remove a diffraction grating;
a metal thin film on the light reaction layer;
a buffer layer configured to prevent deformation of the light reaction layer from affecting the metal thin film, and configured to be an exterior of the light reaction layer; and
a prism or prism array on the metal thin film;
wherein when first light is incident on the metal thin film while the diffraction grating is formed in the light reaction layer, surface plasmon formed on the metal thin film is diffracted so as to output a holography image,
wherein a surface of the buffer layer, which contacts the light reaction layer, is deformed to have a complementary shape to a deformation of the light reaction layer, but an opposite surface of the buffer layer is not deformed, and
wherein the prism or prism array is configured to adjust an inclination angle of the first light.

2. The holography device of claim 1, wherein the light reaction layer is configured to react with second light that is not spatially uniform so as to form the diffraction grating, and
wherein the light reaction layer is configured to react with third light that is spatially uniform so as to remove the diffraction grating.

3. The holography device of claim 2, wherein the second light and the third light have a same incident direction.

4. The holography device of claim 2, wherein the second light and the third light have an incident direction that is opposite to an incident direction of the first light.

5. The holography device of claim 2, wherein the second light and the third light are incident through the light reaction layer.

6. The holography device of claim 2, wherein a first uneven portion corresponding to the diffraction grating is formed in the light reaction layer by the second light, and
wherein the first uneven portion is removed from the light reaction layer by the third light.

7. The holography device of claim 6, wherein a second uneven portion is formed in the metal thin film to correspond to the first uneven portion formed in the light reaction layer.

8. The holography device of claim 2, wherein the light reaction layer is formed of material that reacts with the light to cause piezoelectricity.

9. The holography device of claim 2, wherein the light reaction layer comprises at least one of ZnO doped with Er, Fe:LiNbO$_3$, BSO, BGO, BTO, PZT, and a light reaction polymer.

10. The holography device of claim 1, wherein the buffer layer comprises at least one of gas, fluid, and flexible solid.

11. The holography device of claim 1, wherein the buffer layer is between the light reaction layer and the metal thin film.

12. The holography device of claim 1, wherein the metal thin film is between the buffer layer and the light reaction layer.

13. The holography device of claim 1, further comprising:
an electrode below the light reaction layer;
wherein the electrode is configured to apply a voltage to the light reaction layer.

14. A three-dimensional (3D) image display apparatus, comprising:
a light unit comprising a plurality of light source units;
a holography optical unit comprising a plurality of the holography devices of claim 1; and
a display panel configured to modulate light reproduced by the holography optical unit according to an image signal.

15. A holography device, comprising:
a light reaction layer, configured to react with light so as to form and remove a diffraction grating, and comprising at least one of zinc oxide (ZnO) doped with erbium (Er), $Bi_{12}SiO_{20}$ (BSO), $Bi_{12}GeO_{20}$ (BGO), $Bi_{12}TiO_{20}$ (BTO), and lead zirconate titanate (PZT);
a metal thin film on the light reaction layer;
a buffer layer configured to prevent deformation of the light reaction layer from affecting the metal thin film; and
a prism or prism array on the metal thin film;
wherein when first light is incident on the metal thin film while the diffraction grating is formed in the light reaction layer, surface plasmon formed on the metal thin film is diffracted so as to output a holography image,
wherein a surface of the buffer layer, which contacts the light reaction layer, is deformed to have a complementary shape to a deformation of the light reaction layer, but an opposite surface of the buffer layer is not deformed, and
wherein the prism or prism array is configured to adjust an inclination angle of the first light.

16. A method of processing a holography image of a holography device, the method comprising:
recording the holography image on the holography device by irradiating first light to a light reaction layer of which physical properties are changed by light in order to form a diffraction grating in the light reaction layer;
outputting the holography image from the holography device by irradiating second light to a metal thin film on the light reaction layer, via a prism or prism array on the metal thin film configured to adjust an inclination angle of the second light, in order to diffract surface plasmon formed on the metal thin film; and
deleting the holography image from the holography device by irradiating third light to the light reaction layer in order to remove the diffraction grating;
wherein a surface of a buffer layer, which contacts the light reaction layer, is deformed to have a complementary shape to a deformation of the light reaction layer, but an opposite surface of the buffer layer is not deformed.

17. The method of claim 16, wherein the first light is not spatially uniform, and
wherein the second light is spatially uniform.

18. The method of claim 16, wherein an uneven portion corresponding to the diffraction grating is formed in the light reaction layer by the first light, and
wherein the uneven portion is removed from the light reaction layer by the third light.

19. The method of claim 18, wherein the uneven portion is also formed in the metal thin film.

20. The method of claim 16, wherein the light reaction layer is formed of material that reacts with light in order to cause piezoelectricity.

21. The method of claim 16, wherein the light reaction layer comprises at least one of ZnO doped with Er, Fe:LiNbO$_3$, BSO, BGO, BTO, PZT, and a light reaction polymer.

* * * * *